Aug. 18, 1964  W. S. BUNNELL  3,144,795
TOOL
Filed Aug. 1, 1961
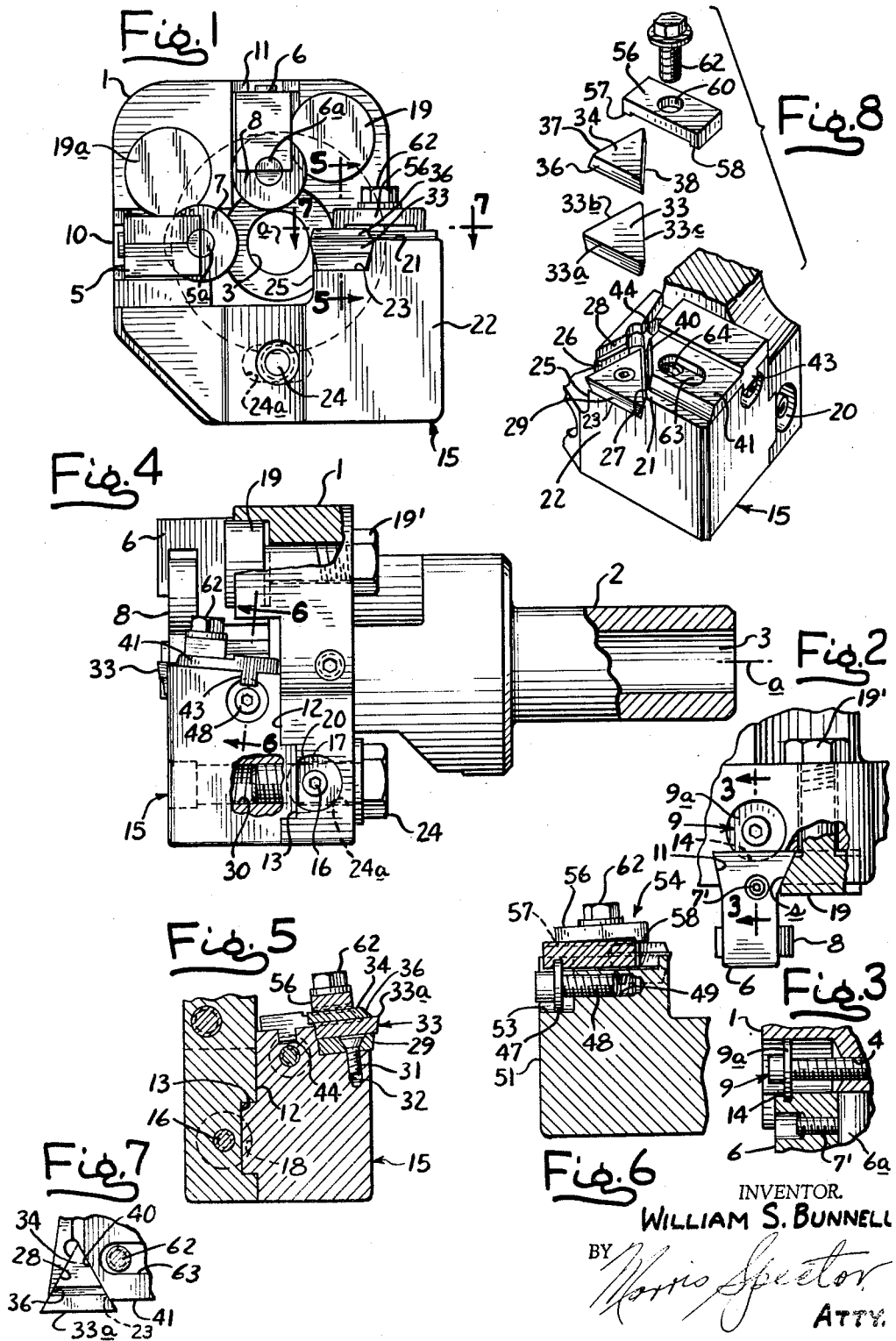
INVENTOR.
WILLIAM S. BUNNELL
BY Morris Spector
ATTY.

3,144,795
TOOL
William S. Bunnell, La Grange Park, Ill., assignor to Boyar-Schultz Corporation, Chicago, Ill., a corporation of Illinois
Filed Aug. 1, 1961, Ser. No. 128,481
5 Claims. (Cl. 82—35)

This invention relates to improvements in tools and, more particularly, to a cutting tool having an adjustable chip breaker.

It is an object of the present invention to provide a cutting tool having a chip breaker which may be quickly and easily adjusted in a novel manner for various types of machineable metals.

It is a further object of the present invention to provide a cutting tool of the type stated in which the chip breaker may be adjusted within the range permitted by the tool regardless of the depth of cut of the tool or feed per revolution.

It is another object of the present invention to provide an improved roller bearing box tool capable of being used on a variety of machine tools; and, furthermore, wherein the box tool may embody the adjustable chip breaker.

It is an additional object of the present invention to provide a tool of the type stated in which the chip breaker is slidably backed by a pair of planar surfaces which are at an angle to each other with one of the surfaces being movable relative to the other without changing the angularity therebetween so that upon movement of that surface, the position of the chip breaker may be changed.

The attainment of the above and further objects of the present invention will be apparent from the following specification taken in conjunction with the accompanying drawing forming a part thereof.

In the drawing:

FIG. 1 is a front elevational view of a roller bearing type box tool constructed in accordance with and embodying the present invention;

FIG. 2 is a fragmentary top plan view thereof, partly broken away and in section;

FIG. 3 is a fragmentary sectional view taken along line 3—3 of FIG. 2;

FIG. 4 is a side elevational view of the box tool, partly broken away and in section;

FIG. 5 is a fragmentary sectional view taken along line 5—5 of FIG. 1;

FIG. 6 is a fragmentary sectional view taken along line 6—6 of FIG. 4;

FIG. 7 is a fragmentary sectional view taken along line 7—7 of FIG. 1; and

FIG. 8 is an exploded perspective view, partly broken away and in section, and showing a portion of the tool of the present invention.

Referring now in more detail and by reference characters to the drawing, which illustrates a preferred embodiment of the present invention, A designates a roller bearing type box tool comprising a tool body 1 having an arbor 2. The tool body 1 also has a central bore 3 which extends completely through the arbor 2. The arbor 2 may be mounted in the chuck of a suitable machine tool as, for example, a lathe or a screw machine. Mounted on the tool body 1 are bearing blocks 5, 6 having shafts 5a, 6a which rotatably support roller bearings 7, 8. A set screw 7' is provided for each shaft 5a, 6a. The bearing blocks 5, 6 are supported on dovetail slideways 10, 11 by which the bearing blocks 5, 6 can be individually adjusted toward and away from the longitudinal axis $a$ of the central bore in accordance with the diameter of the part being machined.

An adjusting screw 9 (FIG. 3) may be threaded into a hole 4 in the body 1, the hole 4 being diametrally enlarged for receiving the flanged head 9a of the screw 9. The flanged head 9a projects into a groove 14 in the bearing block 6 to shift the bearing block 6 upon rotation of the screw 9. The body 1 is also bored for receiving in a locking bolt 19 upon which is threaded a nut 19'. The head of the bolt 19 is flattened at one side $s$ (FIG. 2) and is adapted to be drawn flush against the block 6 upon tightening of the nut 19' to hold the block in adjusted position. The block 5 has an adjusting screw (not shown) similar to the screw 9; and a locking bolt 19a, similar to the bolt 19, is provided for the block 5.

At the front of the body 1 is a bearing surface 12 having a groove 13, the bearing surface 12 and groove 13 constituting a slideway for a tool holder 15. An adjusting screw 16 is threaded into the body 1 and has a diametrally enlarged flange 17 which projects into an arcuate groove 18 on the tool holder 15. As best seen in FIGS. 4 and 8, the tool body 1 has a diametrally enlarged bore 20 for receiving the adjusting screw flange 17. A locking bolt 24 is threaded into a tapped hole 30 in the holder 15, and the bolt 24 projects through an elongated clearance slot 24a in the body 1. It will be apparent that by loosening the bolt 24 and rotating the adjusting screw 16 the tool holder 15 may be shifted back and forth across the bearing surface 12.

The tool holder 15 has top and front surfaces 21, 22 which are cut away to provide a recess 23. The inwardly presented surface 25 of the tool holder 15 likewise has a small portion thereof cut away. As best seen by reference to FIGS. 7 and 8, the recess 23 is substantially in the shape of an equilateral triangle and has a pair of walls 26, 27 which diverge toward the front surface 22. The wall 26 has an upper portion 28 which is slightly offset from the lower portion of the wall 26. A shim 29 in the shape of an equilateral triangle is mounted in the recess 23 with two side walls of the shim 29 flush against the recess walls 26, 27. A set screw 31 projects through the shim 29 and is threaded into a tapped hole 32 in the tool holder 15.

Mounted in the recess 23 and on the shim 29 is an equilateral triangularly shaped tool bit 33. The tool bit 33 is fabricated of a tungsten-carbide steel and is of a "throw-away" type having a plurality of cutting edges 33a, 33b, 33c, whereby the bit 33 may be indexed for selective use of any one of the cutting edges. The tool bit 33 is somewhat larger than the recess 23 and the tool bit 33 is shaped to fit conformably against the recess walls 26, 27. The selected cutting edge to be used (i.e. edge 33a) will overhang the front surface 22 and the adjacent edge of the shim 29 therebelow.

Mounted directly upon the tool bit 33 is an equilateral triangularly shaped chip breaker 34 having a beveled chip-engaging surface 36 which is adjacent and parallel to the cutting edge 33a. The chip breaker 34 has one side 37 in conformable engagement with the wall portion 28 while the remaining side 38 of the chip breaker 34 is adapted to fit conformably against an end surface 40 on a slide plate 41. This slide plate 41 is adapted for linear shifting movement on the top surface 21 to move the end surface 40 toward and away from the wall portion 28. The underside of the slide plate 41 has a rib 43 which slidably engages an upwardly opening groove 44 in the tool holder surface 21.

Formed in the rib 43 is a downwardly opening slot 46 for receiving the head flange 47 of an adjusting screw 48. The adjusting screw 48 is threaded into a tapped hole 49 in the tool holder 15, and at the side face 51 of the tool holder 15 the hole 49 is diametrally enlarged at one end 53 and receives the rib 43 and the head flange 47. Upon rotation of the adjusting screw 47 the slide plate 41 may be shifted in either direction on the bearing surface 21 to move the end surface 40 toward and away from the wall portion 28.

A releasable clamping means 54 is provided for cooperation with the slide plate 41 and tool holder 15 to hold the tool bit 33 and chip breaker 34 within a recess 23. This clamping means comprises a clamping bar 56 having opposite depending ends 57, 58 which bear against the chip breaker and slide plate respectively. The clamping bar 56 has a hole 60 for receiving a locking screw 62 which projects through an elongated clearance slot 63 in the slide plate 41 and into threaded engagement with a tapped hole 64 in the top surface 21.

In use, the roller bearings 7, 8 are adjusted in accordance with the diameter of the stock or part being machined. The locking screw 62 is loosened an amount sufficient to enable the tool bit 33 and chip breaker 34 to be inserted within the recess 23. The chip breaker 34 is placed so that the sides 37, 38 thereof are flush against the wall portion 28 and end surface 40 respectively. The distance between the chip breaking surface 36 and cutting edge 33a may then be checked to determine if that distance is correct for the metal being machined. If the position of the chip engaging surface 36 relative to the cutting edge 33 would cause the chip to be too large, the chip engaging surface 36 must be moved toward the cutting edge 33a. To accomplish this, the adjusting screw 48 is rotated to move the surface 40 toward the wall portion 28, thereby sliding the chip breaker along the surfaces 28, 40 and moving the chip-engaging surface 36 toward the cutting edge 33a. When the desired position of adjustment has been reached, the locking screw 62 is tightened to clamp the tool bit 33 and chip breaker 34 rigidly in position with the recess 23. If it is subsequently desired to increase the length of chip, the locking screw 62 is loosened and the adjusting screw 48 rotated to shift the slide plate 41 away from the wall portion 28, whereupon the chip breaker 38 is manually pushed toward the surfaces 28, 40 until abutment therewith. Also, if desired, the slide plate 41 is shifted toward the wall portion 28 in the manner described to advance the chip-breaking surface 36 toward the cutting edge 33a. Thereafter, the locking screw 62 may be tightened.

The depth of cut of the tool may be adjusted by rotation of the adjusting screw 16. However, the chip breaker can be adjusted independently of the depth of cut taken. Furthermore, the tool bit 33 may be removed and indexed to utilize its other cutting edges 33b, 33c, or, alternatively, thrown away and a new bit used in lieu thereof, all without disturbing the setting of the chip breaker 34 when the latter and the bit are reassembled.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and sought to be secured by Letters Patent is:

1. A cutting tool comprising a tool holder having a seat, a tool bit mounted on the seat and having a cutting edge, a first surface on the tool holder, a slide mounted on the tool holder and having a second surface presented toward the first surface and lying at an angle thereto, a chip breaker seated upon the tool bit and having converging surfaces disposed against said first and second surfaces respectively and being slidable relative thereto, means for shifting the slide toward the first surface in a manner to move the second surface toward the first surface without changing the angular relationship therebetween, the movement of said second surface shifting the chip breaker along said surfaces toward the cutting edge and to a selected position relative thereto, and releasable clamping means cooperating with the tool holder and the chip breaker for holding the latter in its selected position.

2. A cutting tool comprising a tool holder having top and front surfaces recessed to provide a seat, said recess having a pair of walls lying at an acute angle to each other and diverging toward the front surface, a tool bit having a plurality of cutting edges, said tool bit being removably disposed on said seat and being shaped to fit conformably against the pair of diverging walls, one of the cutting edges on the tool bit overhanging the front wall, a chip breaker removably seated upon the tool bit and having a pair of converging surfaces one of which fits conformably and slidably against one of said recess walls, said chip breaker also having a chip-engaging surface adjacent to said cutting edge, a slide mounted on the tool holder and having at one end thereof a surface for conformably and slidably receiving the other surface of the chip breaker, adjusting screw means threaded into the tool holder and being in operative connection with the slide for shifting the latter along a linear path to move said end surface at the end of the slide toward said one wall of the recess, the movement of said slide shifting the chip breaker along said one wall of the recess and along said end surface to move the chip-engaging surface to an adjusted position relative to the cutting edge of the bit, and releasable clamping means cooperating with the tool holder and chip breaker for holding the chip breaker in its selected position and at the same time clamp the tool bit in the seat.

3. In a roller bearing box tool, a body having a central bore and roller bearings adjustable toward and away from the axis of the bore, a tool holder slidable on the body, said tool holder having top and front surfaces recessed to provide a seat, said recess having a pair of walls lying at an acute angle to each other and diverging toward the front surface, a tool bit in the shape of a regular polygon and having a plurality of selectively usable cutting edges, said bit being removably disposed on said seat and being shaped to fit conformably against the pair of diverging walls, one of the cutting edges on the tool bit overhanging the front wall, a triangularly shaped chip breaker removably seated upon the tool bit and having a pair of converging surfaces one of which fits conformably and slidably against one of said recess walls, said chip breaker also having a chip-engaging surface adjacent to and presented toward said overhanging cutting edge, a slide mounted on the tool holder and having at one end thereof a surface for conformably and slidably receiving the other surface of the chip breaker, adjusting screw means threaded into the tool holder and being in operative connection with the slide for shifting the latter along a linear path to move said surface at the end of the slide toward said one wall of the recess, the movement of said slide shifting the chip breaker along said one wall of the recess and along said end surface to move the chip-engaging surface to an adjusted position relative to the cutting edge of the bit, releasable clamping means cooperating with the tool holder and chip breaker for holding the chip breaker in its selected position and at the same time clamp the tool bit in the seat, and means for moving the tool holder toward and away from the axis of said bore.

4. In a box tool, a body adapted for securement to a machine tool, said body having a central bore for receiving the work piece being machined, roller bearing assemblies slidably mounted on said body, means for adjusting the roller bearing assemblies toward and away from the axis of the central bore, a tool holder slidably mounted on the body, said tool holder having top and front surfaces recessed to provide a seat, said recess having a pair of walls lying at an acute angle to each other and diverging toward the front surface, a tool bit in the shape of a regular polygon and having a plurality of selectively usable cutting edges, said bit being removably disposed on said seat and being shaped to fit conformably against the pair of diverging walls, one of the cutting edges on the tool bit being the selected cutting edge to be used and that cutting edge overhanging the front wall, a triangularly shaped chip breaker removably seated upon the tool bit and having a pair of converging surfaces one of which fits conformably and slidably against one of said recess walls, said chip breaker also having a chip-engaging surface adjacent to and presented toward said overhanging cutting edge, a slide mounted on the tool holder and having at one end thereof a surface for conformably and slidably receiving the other surface of the chip breaker, adjusting screw means threaded into the tool holder and being in operative connection with the slide for shifting the latter in one direction along a linear path to move said surface at the end of the slide toward said one wall of the recess, the movement of said slide shifting the chip breaker along said one wall of the recess and along said end surface to move the chip-engaging surface toward the overhanging cutting edge to an adjusted position relative to said overhanging cutting edge, the adjusting screw means also being operable to shift the slide in the opposite direction to retract said end surface on the slide from the chip breaker, releasable clamping means cooperating with the tool holder and chip breaker for holding the chip breaker in its selected position and at the same time clamp the tool bit in the seat, adjusting screw means threaded into the body and in operative conection with the tool holder for positively shifting the tool holder toward and away from said axis of the bore to a selected position, thereby to adjust the position of the tool bit and chip breaker as a unit, and releasable means for holding the tool holder in its selected position.

5. A cutting tool according to claim 1 further comprising a body having a central bore, roller bearings adjustable toward and away from the axis of the bore, means for mounting the tool holder on the body, and means for moving the tool holder with the tool bit and chip breaker thereon as a unit toward and away from the axis of the bore.

References Cited in the file of this patent

UNITED STATES PATENTS

| | | |
|---|---|---|
| 1,020,495 | Hartness | Mar. 19, 1912 |
| 1,130,275 | Hartness | Mar. 2, 1915 |
| 1,919,738 | Melling | July 25, 1933 |
| 2,389,853 | Harris | Nov. 27, 1945 |
| 2,537,837 | Labrozzi | Jan. 9, 1951 |
| 2,546,853 | Fellroth | Mar. 27, 1951 |
| 2,608,121 | Fellroth | Aug. 26, 1952 |
| 2,710,442 | Ranous | June 14, 1955 |
| 2,825,959 | Bader | Mar. 11, 1958 |
| 2,967,345 | Novkov | Jan. 10, 1961 |
| 2,982,008 | Facknitz | May 2, 1961 |

FOREIGN PATENTS

| | | |
|---|---|---|
| 989,307 | France | May 23, 1951 |
| 818,262 | Great Britain | Aug. 12, 1959 |
| 841,546 | Great Britain | July 20, 1960 |